(12) United States Patent
Picon et al.

(10) Patent No.: US 9,710,152 B2
(45) Date of Patent: Jul. 18, 2017

(54) SELECTING OBJECTS ON A USER INTERFACE

(71) Applicant: KING.COM LIMITED, St. Julians (MT)

(72) Inventors: David Picon, Barcelona (ES); Oriol Canudas, Barcelona (ES); David Guerrero, Barcelona (ES)

(73) Assignee: KING.COM LTD., St. Julians (MT)

( * ) Notice: Subject to any disclaimer, the term of this patent is extended or adjusted under 35 U.S.C. 154(b) by 233 days.

(21) Appl. No.: 14/458,890

(22) Filed: Aug. 13, 2014

(65) Prior Publication Data

US 2016/0048286 A1  Feb. 18, 2016

(51) Int. Cl.

| | |
|---|---|
| *G06F 3/0488* | (2013.01) |
| *G06F 3/0484* | (2013.01) |
| *G06K 9/20* | (2006.01) |
| *G06F 3/048* | (2013.01) |
| *G06F 3/0481* | (2013.01) |

(Continued)

(52) U.S. Cl.
CPC ............ *G06F 3/0488* (2013.01); *A63F 13/30* (2014.09); *A63F 13/45* (2014.09); *G06F 3/048* (2013.01); *G06F 3/04815* (2013.01); *G06F 3/04842* (2013.01); *G06K 9/2054* (2013.01)

(58) Field of Classification Search
CPC .... G07F 17/34; G06F 3/0488; G06F 3/04842; G06F 3/048; G06F 3/04815; G06K 9/2054; A63F 13/45; A63F 13/30
See application file for complete search history.

(56) References Cited

U.S. PATENT DOCUMENTS

| | | | |
|---|---|---|---|
| 2009/0203415 A1* | 8/2009 | Falciglia, Sr. | A63F 1/00 463/11 |
| 2013/0331162 A1* | 12/2013 | Krivicich | G06F 3/04812 463/10 |

(Continued)

OTHER PUBLICATIONS

Kellie Cardwell-Winters: "Gems with Friends Walkthrough Cheats and Strategy Guide—Gamezebo,"retrieved from the Internet: URL: http://www.gamezebo.com/games/gems-friends/walkthrough-cheats-strategy-guide [retrieved on May 26, 2014 (Sep. 10, 2012) XP55120149.

(Continued)

*Primary Examiner* — Anil Bhargava
(74) *Attorney, Agent, or Firm* — Saul Ewing LLP

(57) ABSTRACT

A computer implemented method of managing objects presented on a user interface of a computer device having at least one processor and at least one memory, comprising displaying an arrangement of selectable objects each having one or more characteristics, information on said arrangement of objects and said objects being stored in said at least one memory, determining a selection of at least a first object in dependence on a user input received via the user interface, evaluating using the stored information on said arrangement, if the selected shares one or more characteristic with neighboring objects in the arrangement, determining an input time period of the user input; determining, in dependence on the stored information on said board arrangement if the selected object shares one or more characteristics with neighboring objects; and if so indicating a valid status to a user by highlighting or removing at least the selected object.

8 Claims, 26 Drawing Sheets

(51) Int. Cl.
    *A63F 13/45*     (2014.01)
    *A63F 13/30*     (2014.01)

(56) References Cited

U.S. PATENT DOCUMENTS

2014/0135102 A1\* 5/2014 Knutsson ................ A63F 13/12
                                                   463/23
2014/0342791 A1\* 11/2014 Hugh ...................... A63F 13/80
                                                   463/9
2015/0065241 A1\* 3/2015 McCarthy ........... G07F 17/3262
                                                   463/31

OTHER PUBLICATIONS

International Search Report, dated Nov. 24, 2015, and Written Opinion issued in corresponding PCT Application No. PCT/EP2015/068630.

\* cited by examiner

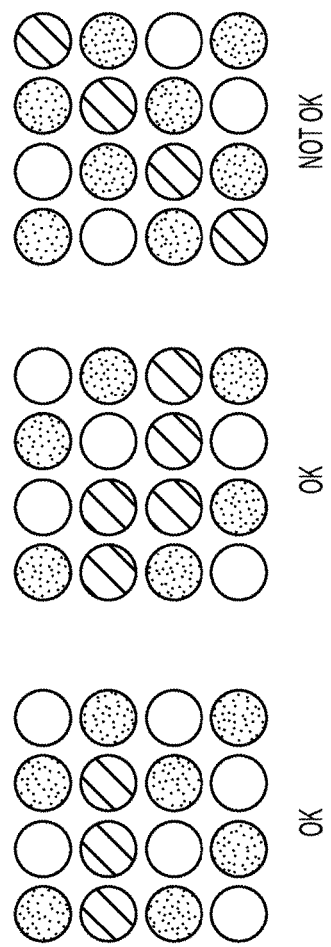

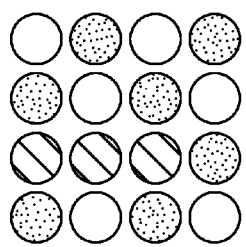
FIG. 15a
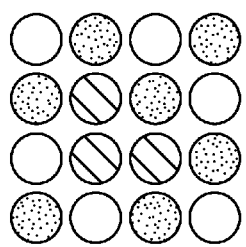
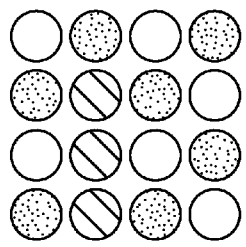
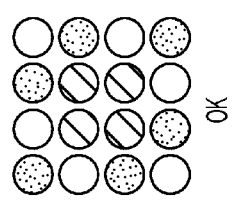
FIG. 15b
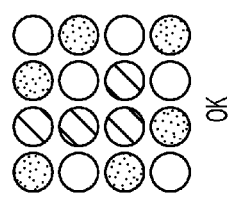
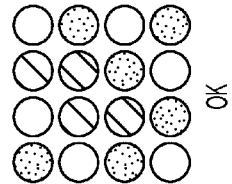
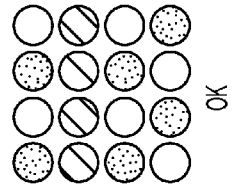
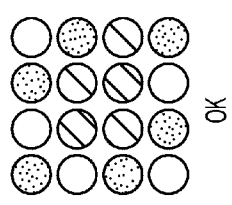
FIG. 15c
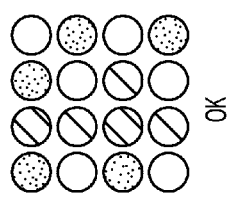
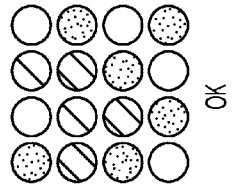
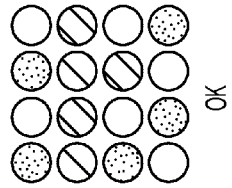

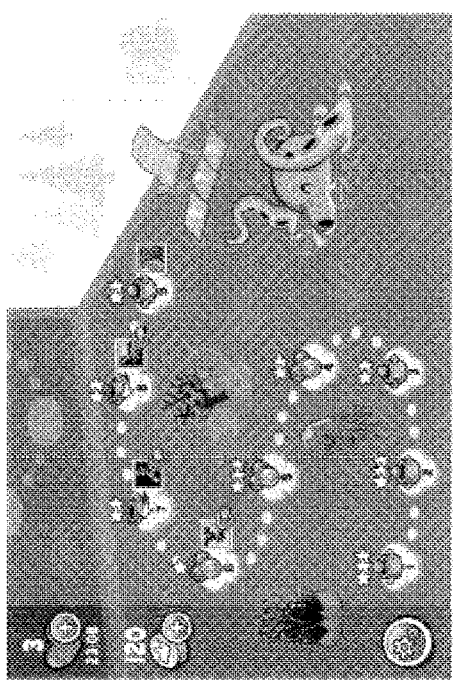
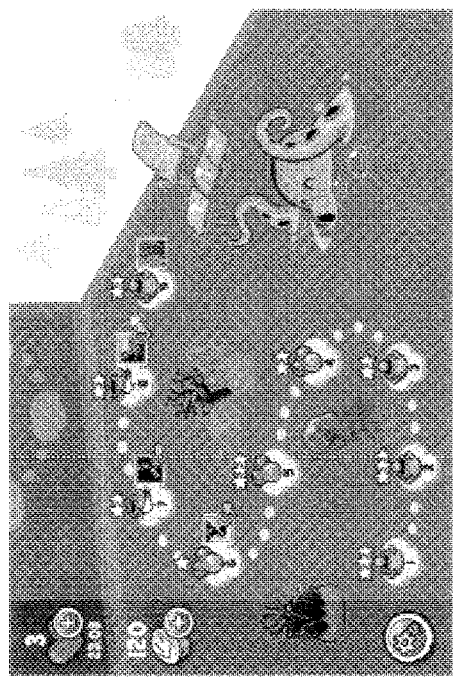
Figure 19a
Figure 19b

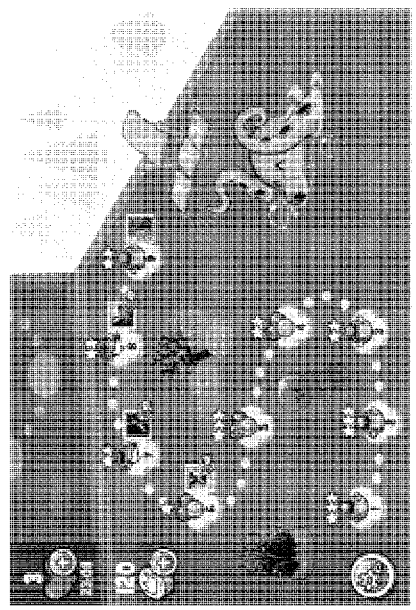
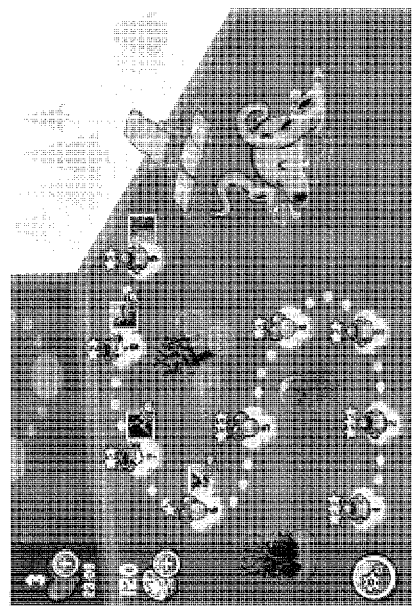
Figure 20a
Figure 20b

SELECTING OBJECTS ON A USER INTERFACE

FIELD OF THE INVENTION

The disclosure relates to controlling a user interface responsive to user engagement with displayed game objects on the interface of a computer device.

BACKGROUND OF THE INVENTION

There are many technical challenges and technical considerations facing the designer of computer games executed on user or computer devices having a user interface, such as designing a controllable user interface in the context of available computer devices and resources, which may be limited.

Some embodiments may relate to devices having a user interface for engaging users or players in a computer game executable in an online environment.

In a scenario where a web based (canvas) application is adapted to a mobile platform, there are challenges in maintaining a similar "look and feel" at a user interface. In particular, the inventors have found that distinguishing between intended inputs can be problematic when dealing with touch input on devices with limited resources such as processing power, small display screens, and low touch input resolution between displayed objects in the user interface.

For instance a known computer application executed at a computer device involves the matching of objects displayed on a game area or game board and the elimination of such to complete a level or aim or target score of such a game. The game may be a so-called "casual" or "social" game, wherein short periods of play are undertaken by the user whenever appropriate according to the user's schedule.

Such games are increasingly offered and played by users on a wide range of devices such as portable devices such as smart phones or tablets or larger devices such as desk top computers or lap top computers. The challenge is to maintain selectability and removal of matched objects in a touch context, such that the familiar game mechanic implemented on canvas can be maintained.

SUMMARY OF THE INVENTION

In a first aspect there is provided a computer implemented method of managing objects presented on a user interface of a computer device having at least one processor and at least one memory, said method comprising displaying an arrangement of selectable objects each having one or more characteristics, information on said arrangement of objects and said objects being stored in said at least one memory, determining a selection of at least a first object in dependence on a user input received via the user interface, evaluating using the stored information on said arrangement, if the selected shares one or more characteristic with neighbouring objects in the arrangement, determining an input time period of the user input; determining, in dependence on the stored information on said board arrangement if the selected object shares one or more characteristics with neighbouring objects; and if so indicating a valid status to a user by highlighting at least the selected object when the input time period exceeds a first time interval or removing at least the selected object where the input time period does not exceed the first time interval.

The method may comprise, if the input time period exceeds the first time interval highlighting the neighbour objects with the same characteristic and if the input time period is less than the first time interval removing the neighbour objects with the same characteristic.

The method may comprise, if the user input period is greater than the first time interval and the selected object shares one or more characteristic with neighbouring objects, and a subsequent user input time period less than the first time interval is determined on a neighbouring object with the same characteristic, removing the selected object and neighbouring objects with the same characteristic.

The method may comprise, if the user input period is greater than the first time interval and the selected object shares one or more characteristic with neighbouring objects, and a subsequent user input time period exceeds the first time interval on a second object other than the selected object or neighbouring object with the same characteristic, highlighting at least the second object if the second object shares one or more characteristics with neighbouring objects.

Highlighting at least one objects may comprises at least one of animating the at least one object, modifying display characteristics of the at least one object and displaying a line around the at least one object.

Removing objects may comprise removing the objects from the initial arrangement to provide an updated arrangement and displaying said updated arrangement.

Determining a selection of at least first object in dependence on a user input received via the user interface comprises determining selection of a plurality of objects, said objects sharing at least one characteristic.

Said user input may be a touch user input.

In a second aspect there is provided an apparatus comprising at least one processor and at least one memory, said at least one processor and said at least one memory configured to perform at least one algorithm to provide a computer implemented game, said algorithm causing an arrangement of selectable objects to be displayed each having one or more characteristics, information on said arrangement of objects and said objects being stored in said at least one memory, a selection of at least first object to be determined in dependence on a user input received via the user interface. using the stored information on said arrangement, if the selected shares one or more characteristic with neighbouring objects in the arrangement to be evaluated, an input time period of the user input to be determined, and, in dependence on the stored information on said board arrangement, and, if the selected object shares one or more characteristics with neighbouring objects, a valid status to a user to be indicated by highlighting at least the selected object when the input time period exceeds a first time interval or removing at least the selected object where the input time period does not exceed the first time interval.

In a third aspect there is provided a computer readable storage device storing program code instructions that, when executed by at least one processor in communication with a user interface and at least one memory, causes the at least one processor to: cause an arrangement of selectable objects to be displayed each having one or more characteristics, information on said arrangement of objects and said objects being stored in said at least one memory, a selection of at least first object to be determined in dependence on a user input received via the user interface. use the stored information on said arrangement, if the selected shares one or more characteristic with neighbouring objects in the arrangement to be evaluated, an input time period of the user input to be determined, and, in dependence on the stored information on said board arrangement, and, if the selected object shares one or more characteristics with neighbouring objects, a valid status to a user to be indicated by highlighting at least the selected object when the input time period exceeds a first time interval or removing at least the selected object where the input time period does not exceed the first time interval.

BRIEF DESCRIPTION OF THE FIGURES

FIG. 14 shows example game element patterns;
FIG. 15a shows example 3-game element patterns;
FIG. 15b shows example 4-game element patterns;
FIG. 15c shows example 5-game element patterns;
FIG. 19a shows an example virtual map view;
FIG. 19b shows an example virtual map view;
FIG. 20a shows an example virtual map view;
FIG. 20b shows an example virtual map view.

DETAILED DESCRIPTION OF THE INVENTION

This disclosure addresses the challenge of providing a "highlight" and "select" function in a touch screen context, provided by a "hover and click" mouse function in a canvas application.

Figure 1:
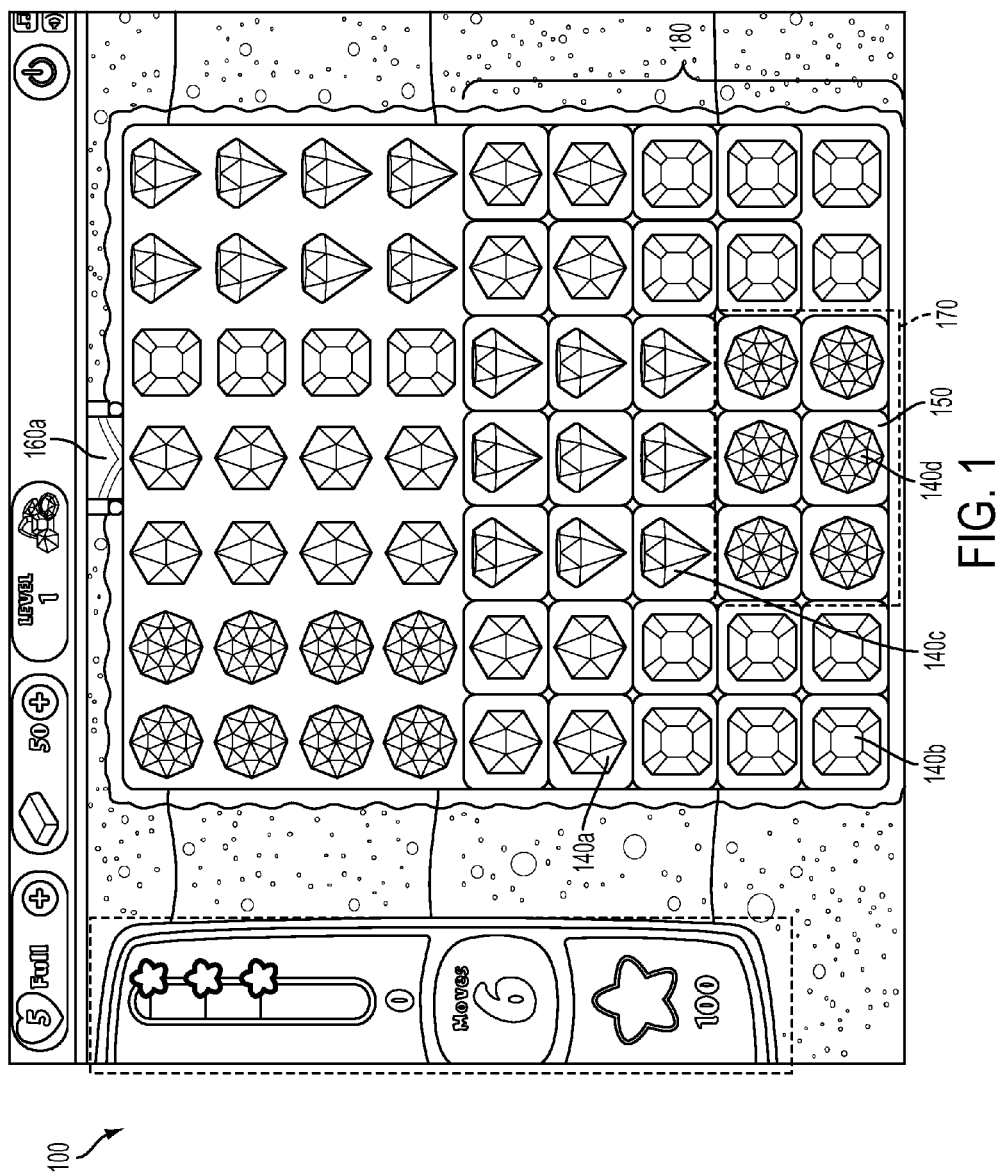
FIG. 1 shows an example game board arrangement.

FIG. 1 shows an example arrangement 100 for display on a user device according to an embodiment. An algorithm is configured to control the device such that an arrangement such as shown in FIG. 1 is displayed. The arrangement comprises a displayed game area 100 having first objects (also referred to as tiles or game elements) 140a, 140b, 140c, 140d. Each tile has one or more attributes. Each attribute may have one or more possible values. For example there may be three or more possible values for each attribute. These objects are game elements or tiles. The attributes may comprise color, shape, and/or different types of objects with associated value. The first objects may have other characteristics defining graphical representations and shapes, and may represent different types of similar objects when displayed on the game area 100.

As can be seen in a second display area 180 of the game board arrangement, the game board may comprise second game objects 150 known as game blocks displayed in a grid. The game objects 140a, 140b, 140c and 140d may be displayed at the same position as game blocks 150 and may be displayed in front or behind of the game blocks 150. The game blocks 150 may be removed from the game board arrangement by removing a game object displayed at the same position and/or removing a series of game objects displayed at the same position, removing a game object, or a series of game objects displayed adjacent to the game block or by any other mechanism such as a booster. For example, if game object 140d is removed from the game board arrangement, game block 150 may also be removed. As the game blocks 150 are removed a path is created by the absence of game blocks. The object of the game may be to create a path between exit and entry points (such as the entry point 160a) by removing game blocks 150.

Those skilled in the art will appreciate that arrangement of other grid sizes or patterns to that shown in FIG. 1 may be suitable.

The first objects 140a, 140b, 140c, 140d displayed on the arrangement 100 may have four (or any other suitable number of) contact points with other neighbouring or adjacent first objects.

First objects 140a, 140b, 140c, 140d may be removed from the game board 100 by user inputs selecting a game object, for example 140d, which meets a validation criteria, for example if a user input selects a game object 140d which has one or more game objects having an attribute with the same value horizontally and/or vertically adjacent, as indicated by the dashed line 170. Other validation criteria may be possible (e.g. game objects having an attribute with the same value positioned diagonally of a contact point). Removal of a first game object 140d may cause the removal of a plurality of game objects. For example, removal of the first game object 140d may cause the removal of the game objects within the dashed line 170 which meet the validation criteria. Removal of at least one first game object from a game board position may cause a rearrangement of the game board such that a new first game object is displayed in the position of the removed game object.

Other game board layouts or configurations may be provided. For example, pyramidal, hexagonal, octagonal or other layouts comprising position spaces or tiles within the game board 100 may be provided for display.

Figure 2:
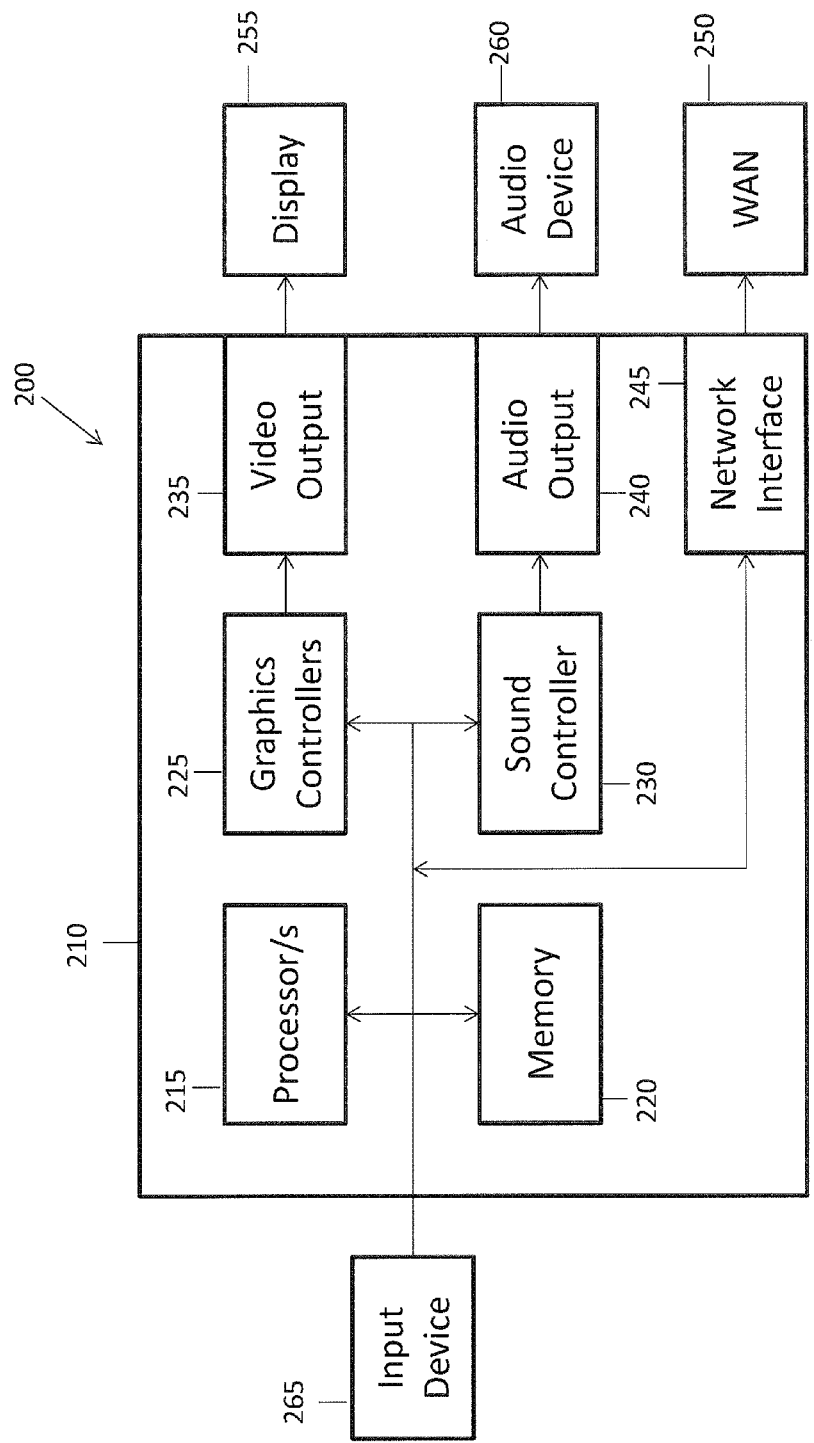
FIG. 2 shows a schematic view of a user or computing device.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
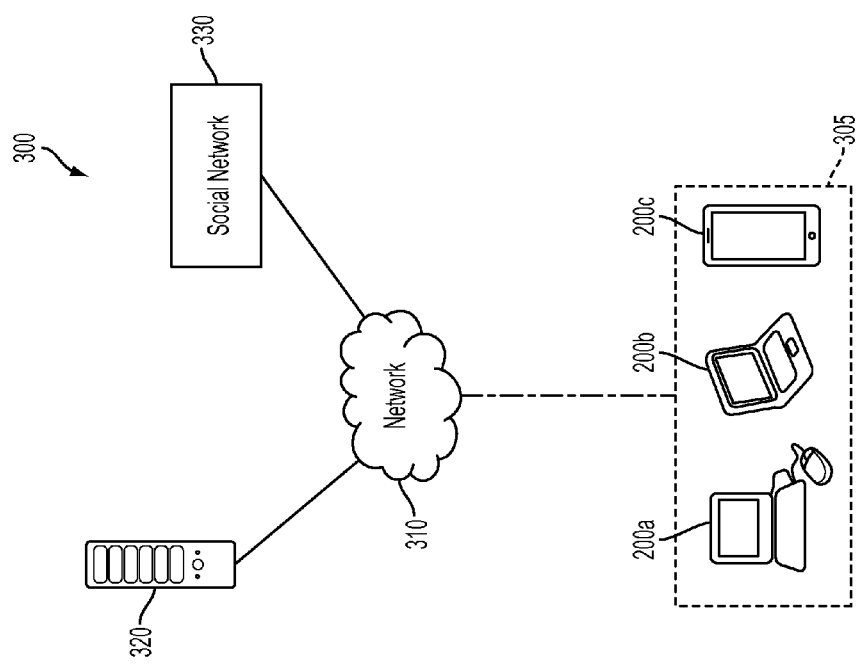
FIG. 3 shows a schematic view of an example system.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Embodiments will now be described with reference to FIGS. 4 to 6.

Figure 4:
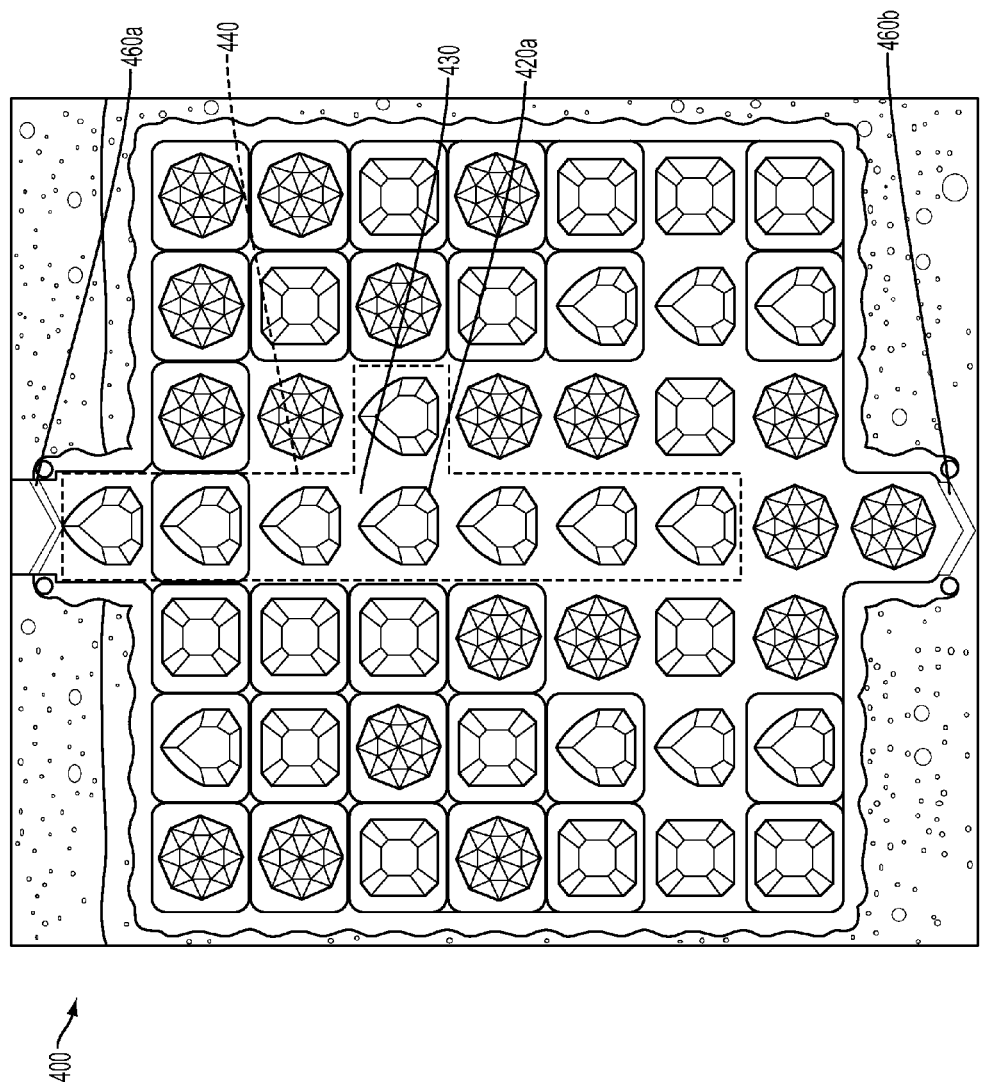
FIG. 4 shows an alternative example game board arrangement.

FIG. 4 shows an example game board 400 comprising game objects as seen in FIG. 1. Input via the user input is detected at a position corresponding to object 420a to select the object 420a. An algorithm may be provided to detect all of the game objects which meet the validation criteria, for example, all the game objects which are horizontally or vertically adjacent to selected game object 420a having the same value for an attribute as the game object 420a. For example, the algorithm may detect the group of game objects 430 which are delineated by the dashed line 440 and which comprises game objects vertically and horizontally adjacent to game object 420a which are "green", i.e. pear shaped as represented in FIG. 4.

In a canvas application, the selection of the object 420a may be by the user moving a cursor using a pointer device such as a mouse, a touch pad or the like. However, on a touch screen (such as a smartphone), the selection of the object may be detected by detecting a user's finger or the like at a location of a touchscreen at the position of the displayed object. A "hover" action of the mouse allows a user to highlight the related object (and associated matching objects). It is possible in this way to easily uniquely identify the object which the user wishes to select. Distinguishing between an intention to highlight a potential move and selecting that move such that game objects are removed from the board may be problematic when a user's finger is used as an input for a touch screen.

Embodiments of techniques enabling such discrimination will now be described with reference to FIG. 5.

Figure 5:
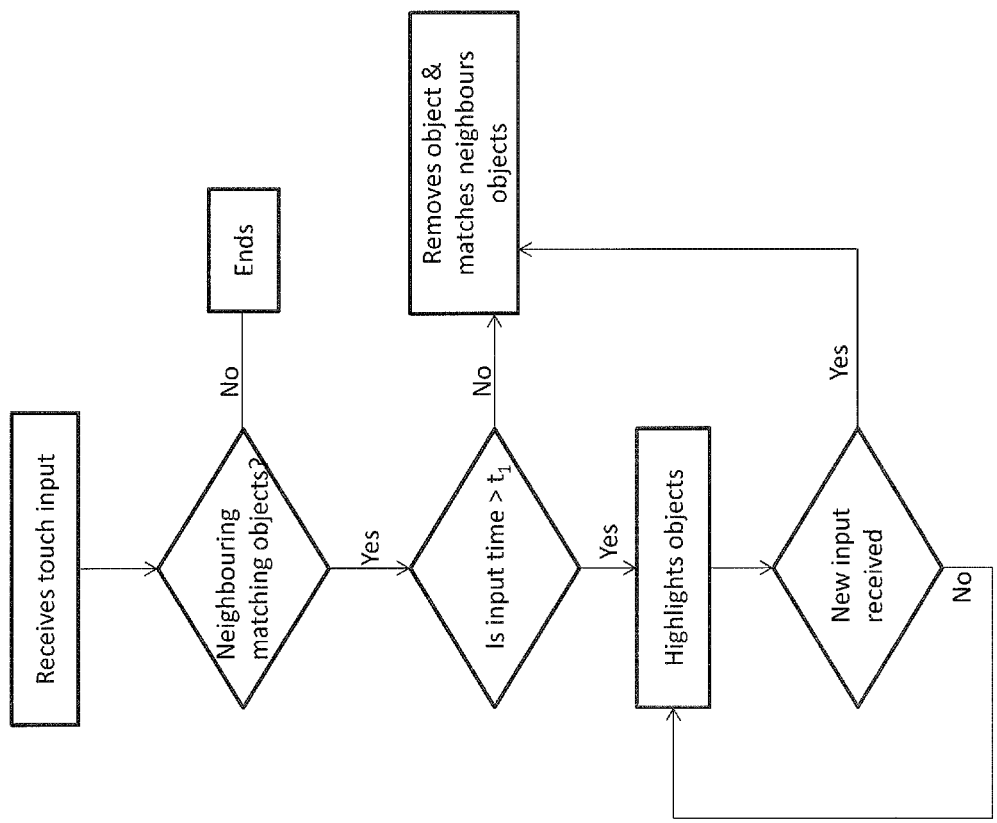
FIG. 5 shows a flowchart of an example method of discriminating between user inputs.
Figure 6:
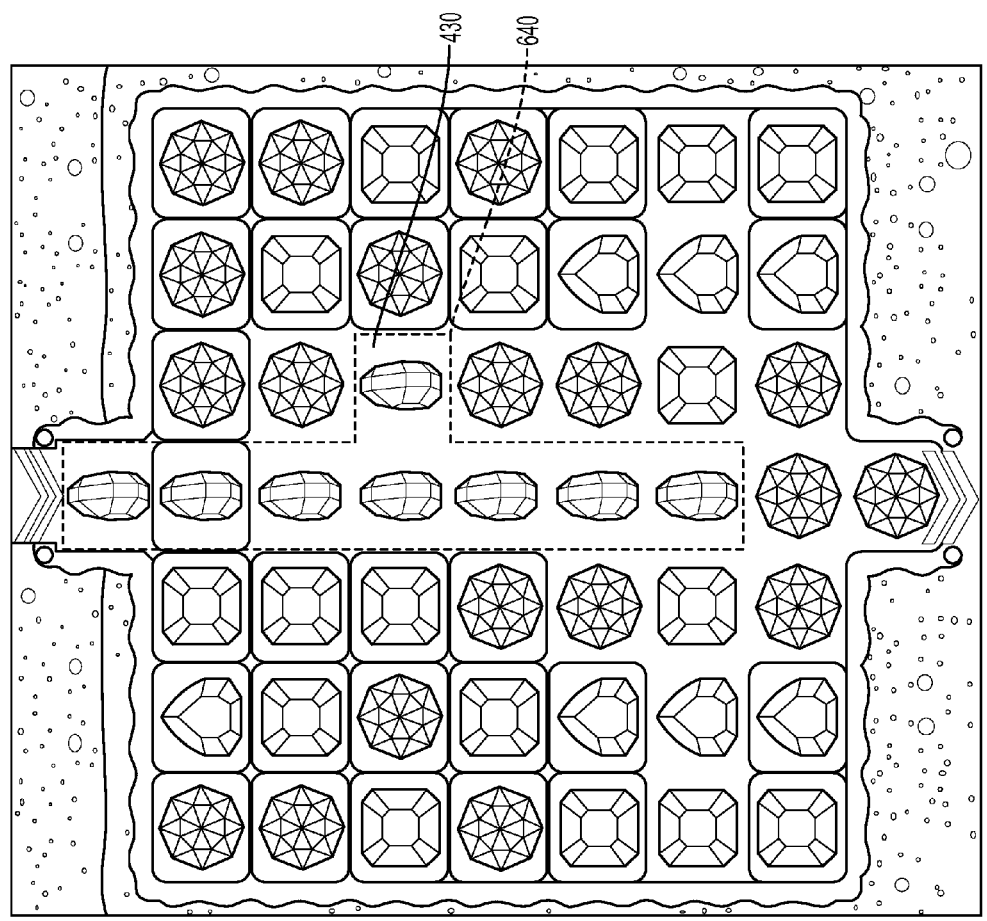
FIG. 6 shows the game board arrangement of FIG. 4 including highlighted game objects.

FIG. 5 illustrates steps of an embodiment of a method. An arrangement of selectable objects are displayed, each having one or more characteristics, information on said arrangement of objects and said objects being stored in said at least one memory.

Step 1 of the method comprises receiving touch input. The method may determining a selection of at least a first object in dependence on a user input received via the user interface. For example, detection of input selection at step 1 at a position equating to a first game object, such as the green "diamond"420a in FIG. 4, is detected by a user interface 265 of a device 200. Selection of more than one object may be detected in dependence on user input received via the user interface, if the objects share at least one characteristic.

In step 2, the method may comprise determining whether selection of the game object results in a valid move, i.e. evaluating, using the stored information on said arrangement, if the selected object shares one or more matching characteristics with neighbouring objects in the arrangement. If yes the method may move to step 3. That is, the algorithm may examine game objects positioned on the game board which are horizontally or vertically adjacent to the selected game object 420a to determine whether they have attributes having matching values to the selected game object.

The method may comprise determining an input time period of the user input. The input may be monitored by processor 215 to detect the end of the user input at to determine the user input time period. In step 3 of the method shown in FIG. 5, the user input time period may be compared to a pre-defined time interval to determine if the input exceeds at least a first time interval. The results of the comparison may be stored in memory 220. If the input time is greater than the first time period, the method moves to step 4; highlighting objects. If no, the objects and neighbouring objects are removed.

That is, if the selected object shares one or more characteristics with neighbouring objects, the method comprises indicating a valid status to a user by highlighting at least the selected object when the input time period exceeds a first time interval or removing at least the selected object where the input time period does not exceed the first time interval. The algorithm may cause highlighting of at least the first game object if the algorithm determines said input is such that it exceeds a first time interval and/or cause removal of at least said first game object, if the algorithm determines that said user input is such that it does not exceed the first time interval. The algorithm may cause the group 430 of game objects which have a matching attribute or characteristic as described above to be highlighted and/or removed. Although step 3 is shown to take place before determining an input time period of the user input, these steps may take place in any order.

This means that it is possible to clearly distinguish between an intention to highlight a potential move and selecting that move such that game objects are removed from the board when a user's finger is used as an input for a touch screen.

If, after highlighting at least one game object, a further user input, as shown as new user input received in the flowchart of FIG. 5, at a position equating to a game object that is not highlighted is detected, the algorithm may act on the further user input as described above.

If the user input period is greater than the first time interval and the selected object shares one or more characteristic with neighbouring objects, and a subsequent user input time period less than the first time interval is determined on a neighbouring object with the same characteristic, removing the selected object and neighbouring objects with the same characteristic. This means that user can touch any object within a group of highlighted objects to remove the group if highlighted objects.

If the user input period is greater than the first time interval and the selected object shares one or more characteristic with neighbouring objects, and a subsequent user input time period exceeds the first time interval on a second object other than the selected object or neighbouring object with the same characteristic, the method may comprise highlighting at least the second object if the second object shares one or more characteristics with neighbouring objects. That is the user can highlight a second group of objects after highlighting a first group of game objects. The highlighting of the first group of game objects may cease.

Causing game objects to be highlighted may involve causing the processor to update the display of the highlighted game objects such that they are animated. For example, as shown in FIG. 6, the display of the group of game objects 430 may be updated so that the game objects of the group 430 appear to rotate about an axis.

Alternatively or in addition, highlighting game objects may cause the processor to update the display characteristics of the highlighted game object(s). For example, the processor may cause the colour, transparency, contrast or brightness of the highlighted game objects to be modified. In a further example, highlighting game objects may cause the processor to surround the highlighted game objects with a boundary, for example a dashed line 640 as shown in FIG. 6.

If the user input is such that the game object 420*a* or group of game objects 430 is to be removed, the processor may execute a rearrangement and update object algorithm. That is the game object 420*a* or group of game objects 430 to be removed are removed from the game board arrangement to provide an updated game board arrangement. Further game objects may move into the place of the removed game objects.

Some embodiments have been described by way of example with respect to example games. It should be appreciated, that other embodiments may be provided in the context of any other suitable games or applications.

The techniques described above can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

The game described herein can be a clicker or a switcher game. The player may in some implementations click on clusters of three or more game elements of a certain type which will remove the cluster of game elements and introduce new ones to take their place. The game board can for instance be a grid of maximum 9×9 tiles and there may be several different types of game elements on the game board.

Some additional elements can also be present on the game board. Such additional game elements can be fixed in a certain position on the game board or can be moveable. In some implementations the shape of the game board may vary as to make the game more challenging as well as offering the player variation in the game.

The ideas described in this document are to some extent implemented in the game 'Diamond Digger Saga' by King.

Game Overview

A technical challenge can involve enabling a game to be fun, accessible and compelling even when there is limited display resource available, such as when a game is being played on a smartphone, tablet or other small or portable device.

Another challenge lies in providing reliable control and selection input across many architectures of such devices with limited or differing display, processing and touch input resources.

This is pertinent when considering user engagement. Engagement involves designing gameplay to be engaging and rewarding to players. This typically requires games to be easily understood at their simplest or introductory levels, control inputs should provide rewarding gameplay with simple to complex game mechanics, which may become progressively more challenging so that players are not frustrated or bored, but remain engaged to develop rewarding skills.

Effective engagement may also require various forms of feedback to reinforce the user or player sense of success and accomplishment.

There are therefore many technical challenges when designing computer implemented games, particularly in providing a challenge to a user or player that is engaging and rewarding so as to provoke repeat play. This may, but not exclusively apply to "casual games" played on portable or mobile platforms with differing and in some cases limited computing, display and input resources.

The game described herein can be played over several levels in a progression type setting where the player advances to more difficult or different levels. Each of the levels in this game is divided up in a plurality of 'rooms' where the player within the level advances from room to room. The rooms are connected with entry and exit points and the player can adjust his gameplay to advance the game through a certain exit point in to a different room.

The game consists of three main elements that may be combined and/or altered to fit the specific level.

Clicking on existing groups of elements on the game board.

Each tile in the game board has a layer that is destroyed once a game element on top is removed. The removed layer creates a "path" on the game board.

"Water" flows from the entry point on the board and the goal for a room is to create a path for the water to flow to any of the exit points in the room. Which exit point the water reaches determines which the next room on the level the player will advance to.

Figure 7:
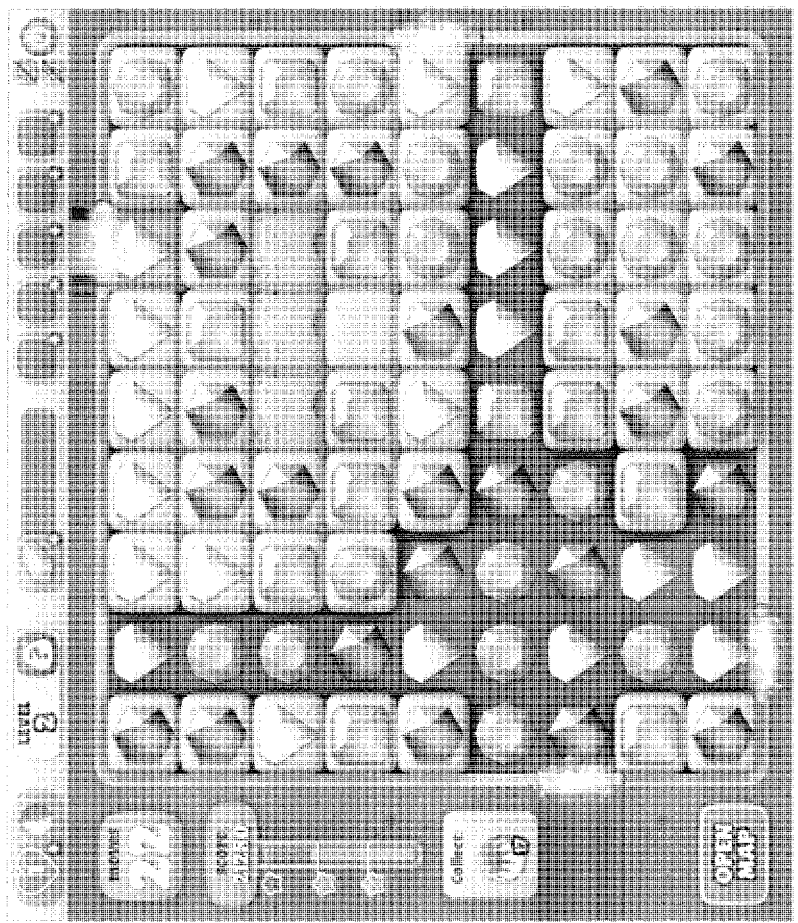
FIG. 7 shows an example game board arrangement.
Figure 8:
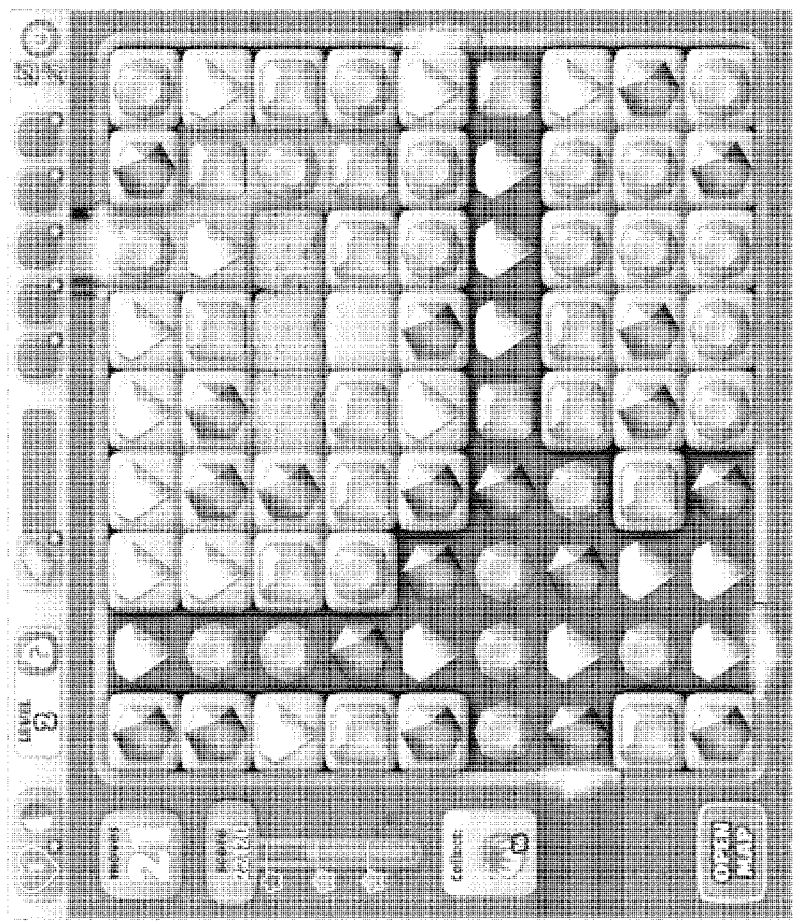
FIG. 8 shows an example game board arrangement.

In some implementations, the game elements covering the game board are implemented as jewels. Any group of 3 game elements or more of the same colour that are horizontally or vertically adjacent can be cleared away and replaced by new game elements that fall into place from the top of the game board. Behind the game elements are game blocks implemented as dirt. When game elements are cleared away, the dirt layer behind them is also cleared which creates cleared paths on the game board. Clicking on clusters of three or more game elements of a certain type will dig paths on the game board. FIG. 7 and show an example game board arrangement with entrance and exit points for water.

On the edges of the game board there may be an arbitrary number of exit points together with one entry point. The entry point may for example have water that will flow on the game board and fill the cleared out "path". At each level a marker of for example blue highlights the water's entry point on the game board. The challenge is to remove game elements in a smart way to create a path and connect the entry point with one of the exit points. Connecting an entry and exit point will take the player to a new game board that may be even deeper underground. If reaching a new game board, the entrance point may be located in the same position as the exit point that was used on previous game board. When the water reaches one of the other exit points available on the game board then the level may be completed but as mentioned may also continue onto a new game board which may be part of the level or an extra bonus part of a level. If the water reaches more than one exit point at the same time, then the bottom exit point will always be chosen if applicable. An exit point may in some implementations not be located on the top edge of the game board.

The game can be implemented so that the first exit point that is reached with the path is the one that is used. Should two exit points be reached at the same move then one of the exit points can take priority, for instance the bottom one over ones on the left and right side. It can also be implemented so that it is random which exit point that takes priority.

The deeper the player reaches, the more treasures and gold will be located on the way. The real challenge is doing this with as few moves as possible. Extra moves are being rewarded for completing a game board which will then let the player continue until running out of moves or time.

Clearing a level will also raise a standard score multiplier, giving the player more points on the next game board reached within the same level.

There is a limited amount of moves/diggings possible; this is shown to the side of the game board as a number of remaining moves (See FIG. 5). Clearing large groups of jewels gives bigger scores and sometimes bonus moves. A good strategy it therefore to go for large groups to both conserve moves and get a high score.

As digging through a level, treasures may be uncovered in the shape of gold and chests that give a score bonus as well as a score multiplier that doubles the score for the rest of the level. Extra moves can also be found in the ground. The deeper the digging, the more treasure will be found. A good strategy is to always aim, if sensible, for bottom exit points when digging rather than sideways exit points.

Some levels also have blockers in the shape of rocks instead of regular dirt blocks. These require the player to clear game elements twice on top of them to excavate a path for the water. Other types of blockers may also be encountered.

Game Flow

The game is a clicker game that may be time based or it may be more relaxed with a limited amount of moves. What makes the game different from other match-3 clicker games is that one level may consist of several sub levels where the player is digging paths between an entry point and exit point to reach the different sub levels. Compared to other games that don't have sub levels, the game focuses on the challenge of transportation by completing these sub levels. Using fun map sections with challenges, treasures to discover and selling extra moves gives a unique breed of a game. There are other games that also have a map of a level but what is different is that those games have a map with a giant game board that scrolls new areas into view while playing. Diamond Digger Saga has divided their levels and uses several game boards on one level map instead of one giant game board.

There are maps both within a level for the player to plan which game board is best to try and reach as well as outside of levels for the player to be able to choose which level to play; perhaps the furthest reached level or maybe a previously completed level to try and beat a highscore.

The goal of the game is to dig down through as many game boards as possible and on the way reach enough points to pass a level or to beat ones own or other friends' highscores.

Story & Theme

In some implementations, the theme is colourful and cute with fantasy creatures and friendly insects with personalities spread out on a map of seemingly flying round islands.

Figure 9:
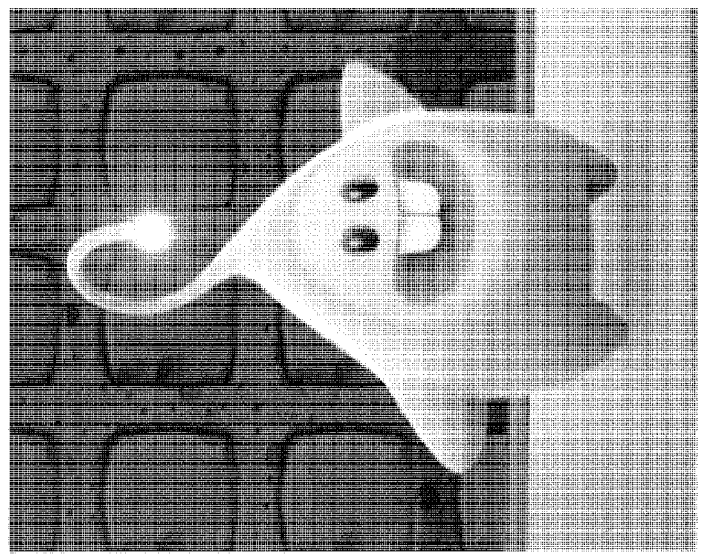
FIG. 9 shows an example game character.

The player follows a path and for each level, the player guides a yellow star shaped characters with an antenna on its head which glows in the top. This character is displayed on the specific maps for a level and shows which game board has been reached. FIG. 9 shows an example character.

Controls

Figure 10:
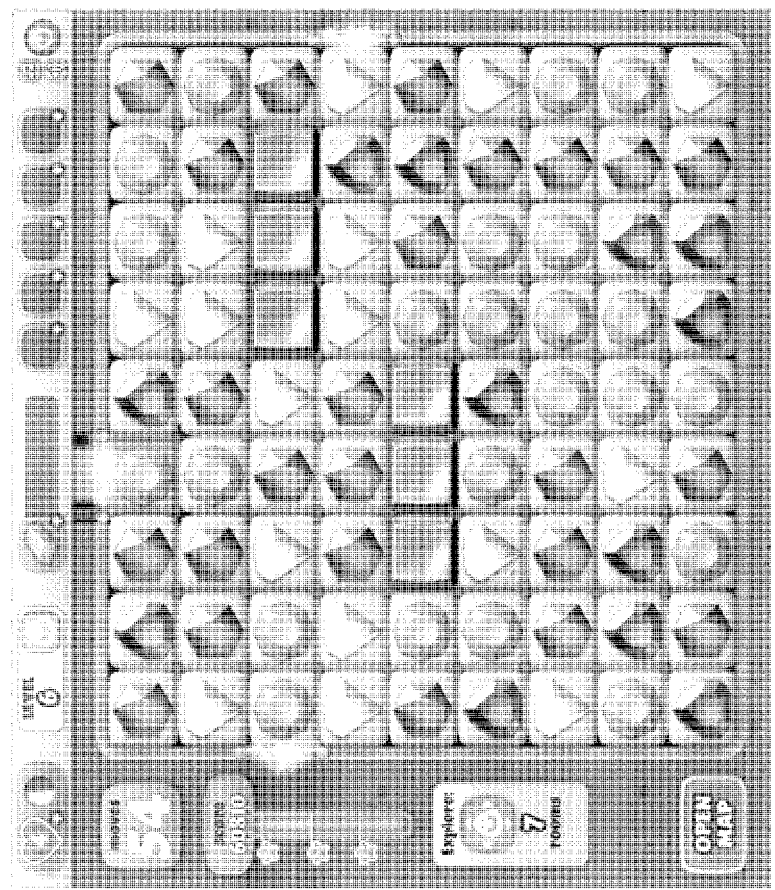
FIG. 10 shows an example game board arrangement.

In some implementations, the controls for turning on and off music and other sounds may be found in the top or bottom right corner as can be seen in the example game board of FIG. 10.

If wanting to end the game prematurely, the End Game icon can be pressed in for example the top or bottom right corner.

Levels

Levels have different stages and are in a way a bit more complex compared to other match-3 clicker games. In a typical implementation there are sub levels as well as bonus levels.

Sub Levels

Levels are divided into several sub levels where each sub level has its own game board. The goal for each sub level is to create a path between an entry point and an exit point. In some implementations there is one entry point and one to three exit points. In other implementations the number of exit and entry points may vary.

By completing sub levels (game boards), the player is working towards the main goal of the whole level. In a typical implementation, moves, timers and points are shared throughout the main level and are not separated between the sub levels.

Bonus Mode

Figure 11:
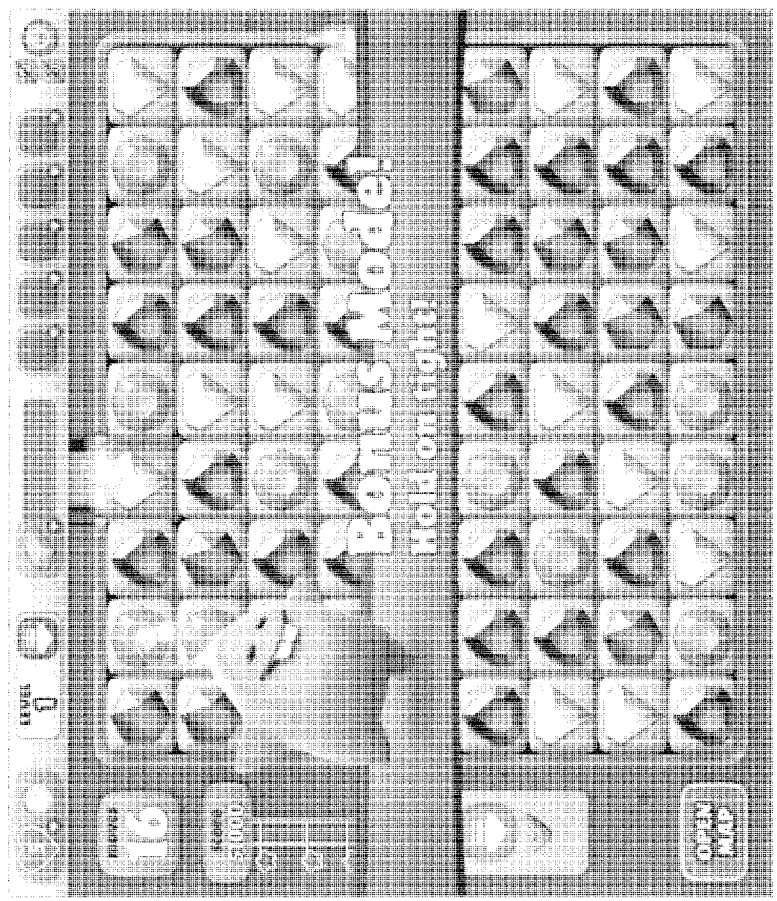
FIG. 11 shows an example game board arrangement in a bonus mode.

The player may continue in bonus mode if completing a level with either moves or time left. If doing so, the player continues either on the current game board he is on, or a new game board may be opened where the player simply creates as good and as many matches as possible before time runs out or there are no more moves left. In bonus mode the player does not need to worry about connecting an exit and entry point as at this points it is only about earning more points for the final score. FIG. 11 shows an example display when a game board is opened in bonus mode. Here the player can use up all remaining moves.

Map

The game has two types of map: one world map outside of levels, and another map during the play of levels.

World Map

The world map takes the player on a journey through a cute fantasy world. For each level completed, the player moves forward on the map. In some implementations there may be characters with stories that the player meets along the way. When jumping from one area to another the player may travel over a rainbow to get there. Having a map in the game encourages the player and makes a graphic implementation of the player's progress in the game.

Figure 12B:
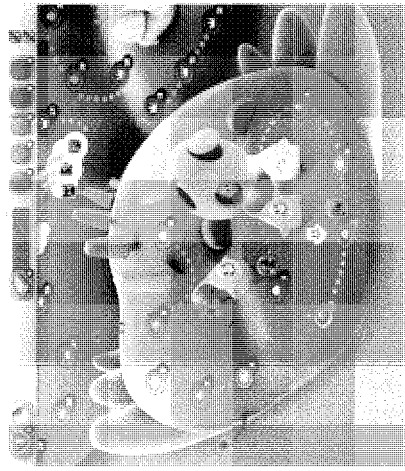
FIG. 12b shows an alternative example of a map view.
Figure 12C:
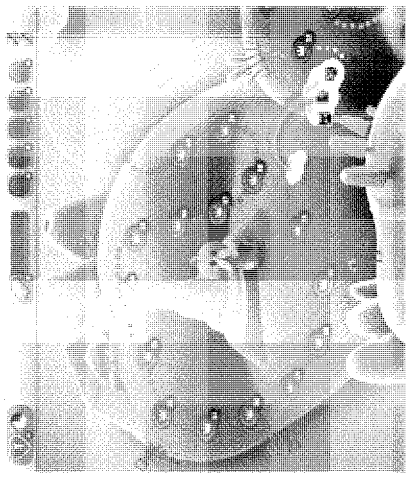
FIG. 12c shows an alternative example of a map view.
Figure 12A:
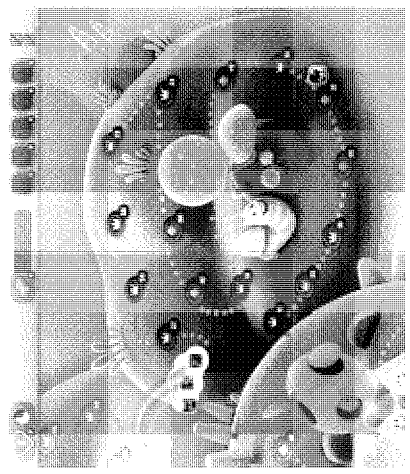
FIG. 12a shows an example of a map view.

Besides seeing one's own progress on the map, the result of previous completed levels can be seen. Number of lives left may be displayed as well as possible in-game currency and boosters. FIGS. 12a, 12b and 12c show examples of a map view.

Level Map

This map is displayed just before starting a level. It can also be viewed at any time during the play of a level.

The level map displays all the possible sub levels available as well as giving hints on which sub level is containing more treasures and items compared to other sub levels. The player can see which sub levels they have already completed and how many more they may need to complete. By showing all this information, the level map helps the player to be strategic on which sub levels to reach for and which ones to avoid.

In some implementations the level map looks different depending on what type of level is being played. If a level has the goal to reach to a certain depth then the level map may have a marker implemented as for example with a white dotted line, showing how deep the player needs to go (See FIG. 13a).

Figure 13B:
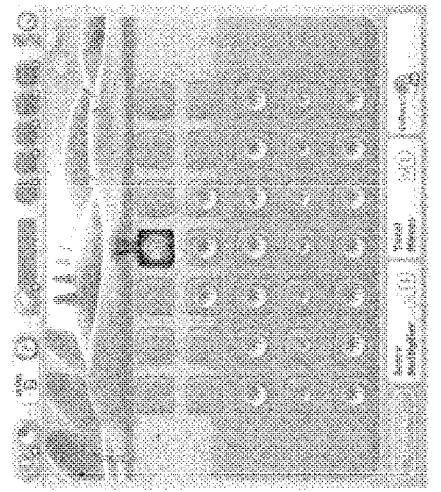
FIG. 13b shows an alternative example level map.
Figure 13A:
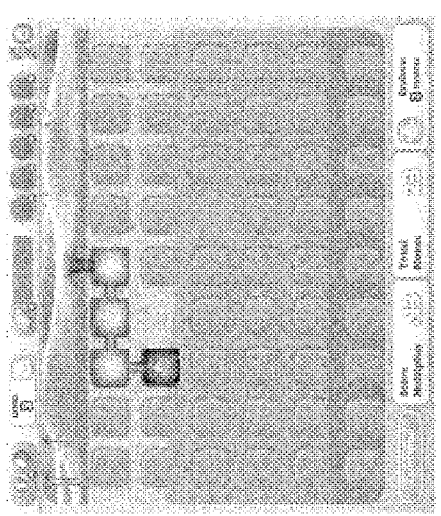
FIG. 13a shows an example level map.

If the goal of a level is to collect a certain number of items, then sub levels may have indicators on them showing if they contain many, a few or none of those items (See FIG. 13b).

Figure 13C:
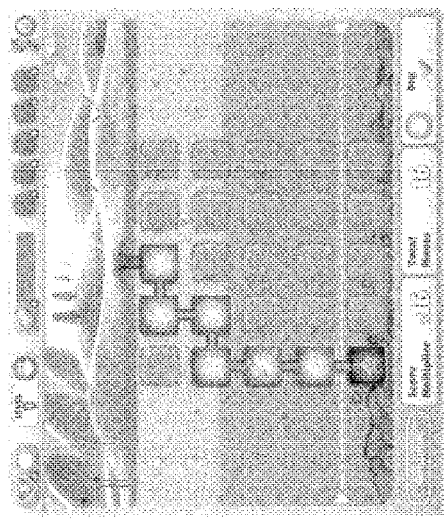
FIG. 13c shows an alternative example level map.

If there is another goal just to pass a certain number of sub levels, or as many sub levels as possible, then the map does not have any of the above mentioned markers (See FIG. 13c).

Not all levels have the same goals in order to be completed. There are several different kinds of levels where different goals need to be fulfilled in order to complete the level. On all levels with limited moves, the moves are shared over all the game boards and only a few moves are returned in between game boards. Therefore, the player needs to be tactic and try and use as few moves as possible to be able to complete a level.

Dig to the Bottom

Here the player needs to dig down to a certain depth on the level map. After reaching the required depth as well as having collected a predetermined minimum amount of points, the level will be completed. If moving sideways on the level map then the player does not come closer to the level goal but may earn some more moves as well as extra point. The total number of moves is connected to all sub levels on that level and not just the current one being played. It is therefore important to try and spend as few moves as possible to make sure to have moves left when reaching later sub levels.

Collect all Items

In this game mode the player needs to collect a certain number of items to pass a level. The items are found by removing dirt blocks on the game board. On this type of level, not every sub level has items to be found. The player needs to look at the level map and strategically choose where to go, hence it may not always be the best option to move straight down on the level map.

Explore Rooms

This game mode requires the player to complete an arbitrary number of sub levels which in some implementations are referred to as rooms. It does not matter how deep the player journeys on the level map but only the number of sub levels completed.

Combos & Points

Depending on how and how many game elements are removed, different amount of points are given. To create matches with game elements, the game elements need to be placed in a group where one side of a game element is adjacent to the other game element. It does not need to be a straight line as long as the game elements are adjacent to each other. For example, a diagonal pattern would not be matchable while an L-shaped group would be as can be seen in FIG. 14.

Colour Combos

Colour combinations are the most basic way of progressing in Diamond Digger Saga. Used to earn points, uncover treasures and other bonus items such as extra moves. It is also used to create paths on the game board in order to connect entry and exit points. Colour combos make up the bulk of the gameplay in the game.

3-Combos

Combinations made from three game elements of the same colour are the most basic combos in the game. Examples can be seen in FIG. 15*a* In some implementations this combo gives 10 points.

4-Combos

In some implementations, combinations made with four game elements award 20 points. Examples can be seen in FIG. 15*b*.

5-Combos

In some implementations, combinations made with five game elements award 30 points. Examples can be seen in FIG. 15*c*.

Multi-Combos

In some implementations, combinations made with more than five game elements reward+10 points for each additional game element in the group.

Dirt

The dirt is placed behind normal game elements. In some implementations it will award 10 points per piece when removed.

Blocker

In the game there are different types of blocks and blockers. In some implementations, clearing a piece of ground or rock award 10 points per piece.

Using a Line Blast

In some implementations, using a special game element called line blast awards the same amount of points as if all the cleared game elements and ground blocks were a part of a regular group, for example a multi-combo group.

Using a Colour Bomb

In some implementations, using a colour bomb awards 10 points per removed game element and dirt block.

Level Multiplier

In some implementations, the game starts with a general level multiplier factor of X10. For each sub level completed this factor is raised one step so that on the second level the multiplier is X11, on the third level X12 and so on. For example on level 1 the removal of a dirt block will award 10×10 points. On level 2 it would award 10×11 points and so on.

Special Multiplier

When creating paths on the game board, a special multiplier can be found under the dirt blocks that are being removed. If finding the special multiplier the player's scores, including the standard level multiplier, are doubled temporarily until the end of the sub level.

Treasures

Different types of treasures can be found when clearing dirt blocks on the game board. In a typical implementation, some of these treasures are so called gold nuggets.

Finding one gold nugget awards 50 points

Finding three gold nuggets awards 100 points

Finding five gold nuggets awards 250 points

There may also be treasure chests buried under the dirt blocks.

A small treasure chest awards 300 points

A medium treasure chest awards 500 points

A large treasure chest awards 1000 points

All treasure scores are also affected by the level multiplier.

Objects

Line Blast

Figure 16:
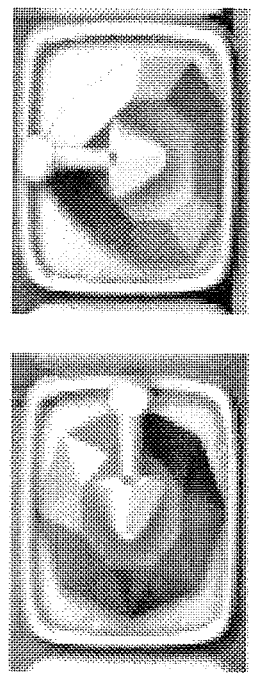
FIG. 16 shows example game elements.

Sometimes game elements may appear on the game board that look like jewels with an arrow marker on them. An example is shown in FIG. 16. The arrow indicates that the game element will release a line blast in the direction of the arrow when cleared. The line blast removes everything in front of the arrow either in a horizontal or vertical line.

Colour Bomb

Figure 17B:
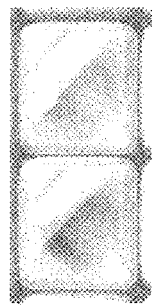
FIG. 17b shows alternative example game elements.
Figure 17D:
FIG. 17d shows alternative example game elements.
Figure 17F:
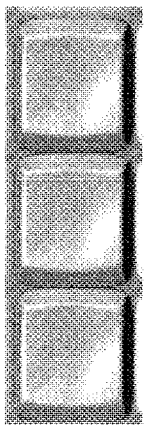
FIG. 17f shows alternative example game elements.
Figure 17A:
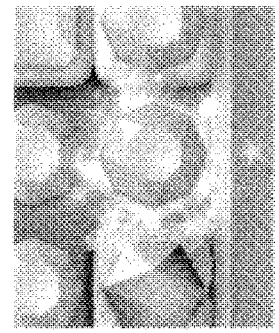
FIG. 17a shows alternative example game elements.

As dirt is being removed on the game board, a game element may turn into a colour bomb. This is indicated by the game element suddenly starting to glow. Using the colour bomb in a combination will instantly clear all game elements of the same colour. An example colour bomb is shown in FIG. 17*a*.

Extra Moves

In some implementations when the player is removing dirt blocks from the game board, the player can uncover a bonus item that immediately gives the player a few extra moves. The player could for example be given two or three extra moves although the number is arbitrary.

Special Multiplier

While removing dirt blocks, the player may also uncover special multipliers. If finding the special multiplier the player's scores, including the standard level multiplier, are doubled temporarily until the end of the sub level. Other implementations may have multipliers that triples the points or that are in effect during the course of a whole level. It could also be time limited and valid only for a predetermined amount of time.

Gold & Chests

In some implementations, some of the objects found when removing dirt on the game board are gold pieces and chests. They do not have any special effects but are still useful as they give the player bonus points. Receiving bonus points may the extra hand needed to sometimes complete a level.

Blockers

In a typical implementation of the game there are several different kinds of so called blockers. Blockers are different types of blocks and game elements with the purpose of being in the way and make the game more difficult for the player. In this way, the game becomes more challenging for the player and at the same time may bring encouragement when a player has completed a level as the player may feel a sense of achievement for completing something more difficult.

Ice Blocker

In a typical implementation, these blockers contain other game elements. Having a match next to these blockers will break them and free the game elements inside them. While the game elements are trapped in the ice blocks, they can't be part of a combination. An example ice block is shown in FIG. 17b.

The ice blocks are not fixed on the game board but fall down as the rest of the game elements when space is cleared underneath them. New ice blocks may also fall onto the game board when space has been cleared.

If a line blast element is being triggered and an ice block is within its area of effect, the ice block will also be removed together with the other game elements.

Clay Blocker

Figure 17C:
FIG. 17c shows alternative example game elements.

In some implementations this blocker appear as a block of hardened clay. It may not have any game elements on top of it and its position is fixed on the game board, i.e. it does not fall down even if there is an empty space below it. Other game elements cannot fall through this blocker but the blocker may be removed. Having a match next to the blocker will either remove the blocker or remove one of its layers. In a typical implementation the blocker has one or two layers and therefore needs one or two matches next to it to be removed. The blocker is not limited to only two layers however but may be implemented to have more. An example clay blocker is shown in FIG. 17c.

In some implementations, if a line blast element has been triggered and its area of effect goes through the blocker, then the blocker may be removed together with the other game elements.

Rock Blocker

In a typical implementation, this blocker needs either one or two matches on top of it to disappear. When removed the blocker will reveal the standard dirt block that needs to be removed in order to make a path between the entry and exit point(s). If the rock blocker is not removed then the path can not go through that way. In some implementation this blocker may have even more layers before it is removed. An example rock blocker is shown in FIG. 17d.

If a line blast would hit a rock blocker, then the rock blocker would have one layer removed and it would not block the effect of the line blast element.

Purple Blocker

Figure 17E:
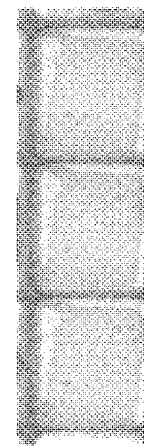
FIG. 17e shows alternative example game elements.

In some implementations there are blocks which are simply there to take up space on the game board. No game elements can be placed on top of these blockers. The blockers can't be removed and they are also fixed on the game board, i.e. if game elements are cleared underneath the blockers they will not fall down to take their place. Instead game elements placed above the purple blockers will fall through the blockers and fill up the empty space. If a path has been made between an entry and exit point and there is a purple block in between, then the water (as it is in some implementations) will not flow through the blocker and therefore not reach the exit point. A path has to be made around the blocker. An example purple blocker is shown in FIG. 17e.

If a line blast element is triggered and there is a purple blocker in its area of effect, then the blocker will not be removed but it will still let the effect of the line blast element go through it and remove the game elements on the other side of it.

Metallic Blocker

In a typical implementation, this blocker cannot be removed and is fixed into place on the game board. It does not let any game elements fall on top of it or through it. If a line blast element is triggered and it's within the line blast's area of effect, then it will hinder the effect to go through and no game elements behind the blocker will be removed, including the blocker itself. An example metallic is shown in FIG. 17f.

Boosters

The game may be implemented to offer the player the opportunity to buy or to generate or in some other way acquire boosters to enhance the gameplay. The boosters can in some implementations match the obstacles introduced on the game board.

+5 Moves

In some implementations, there are boosters available before starting a level. One of those is a booster that gives the player five extra moves. This booster may also be available in other parts of the game as for example during the session of a level or perhaps when the player has run out of moves and is given an option to receive five more moves.

+15 Sec

In other implementations when a level may be time based, there is a booster available before starting a level that gives the player 15 more seconds to play. This booster may also be available in other parts of the game as for example during the session of a level or perhaps when time has run out and the player receives an option to continue 15 seconds more.

Show Treasures

If the player has trouble with earning enough points on a level or finding the correct items to finish a level, a booster that shows where these things are hidden on the game board may indeed be helpful. In some implementations, this booster can be chosen before starting a level as well as while playing a level. The booster could be implemented so that it only shows the hidden items for a short period of time, or during the whole session of a level or sub level.

Colour Bomb

Another booster that is available in a typical implementation is the colour bomb booster. It can be available before starting a level which then lets the player start the game with a colour bomb randomly placed on the game board. It could also be implemented so that the booster is chosen during the play of a level and the colour bomb could either randomly be placed on the game board or the player could choose where to place it.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a path, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API. It allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, have a limited number of levels and no external social network connection. In some implementations players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 18:
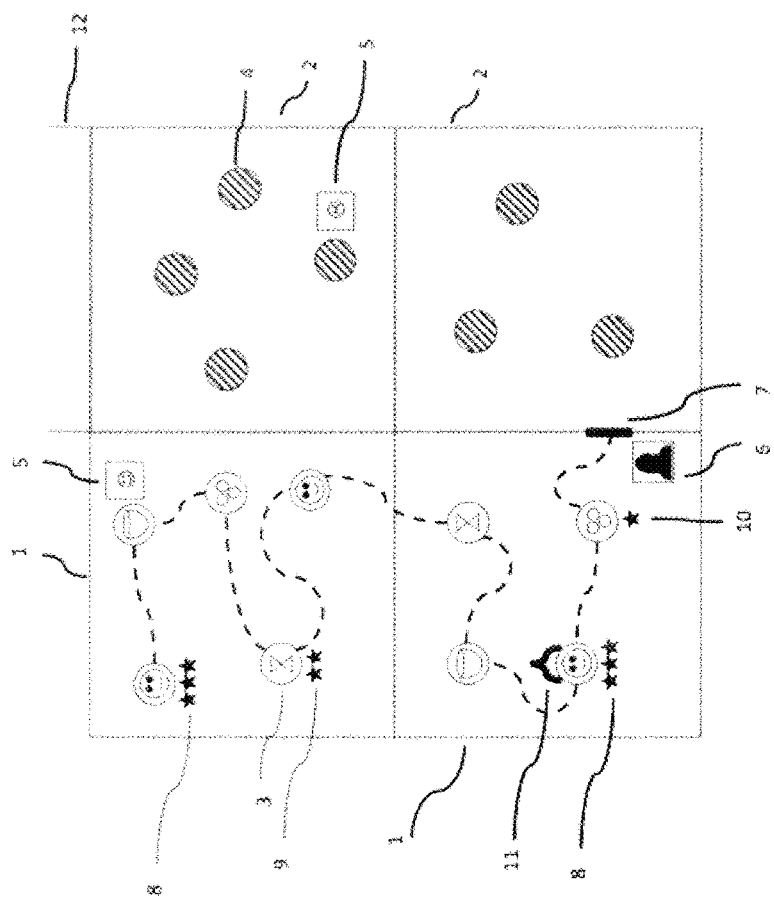
FIG. 18 shows an example of a virtual map.

The game can be implemented so that a player progresses through multiple levels of changing and typically increasing difficulty. FIG. 18 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

If a player does not have an Internet connection and is unable to ask friends for help through a social network as well as being unable to pay to unlock the next stage, then there is another alternative to unlock a locked stage. In a typical implementation this is an offline alternative called 'Mystery Quests' but it may also be available in an online setting. Mystery quests give players the option of completing one or several challenges in order to unlock a stage. Such challenges can for instance be to replay previously played levels with or without modified level goals. In some implementations three challenges need to be completed in order to pass a locked stage. It is also possible to combine the ways of accessing a locked stage. For instance, completing one Mystery quest could make it so that the player only has to request help from two friends once a connection to a social network has been established, or that the player does not need to pay as much for purchasing the unlocking of a stage.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 18, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 18 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores, or to receive other rewards that may come from certain levels when for example earning a certain amount of points or stars.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

One example of how the virtual map can be dynamic and moving is shown in FIG. 19 to FIG. 20. There are only slight differences between each picture, but when played in sequence they will make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 21:
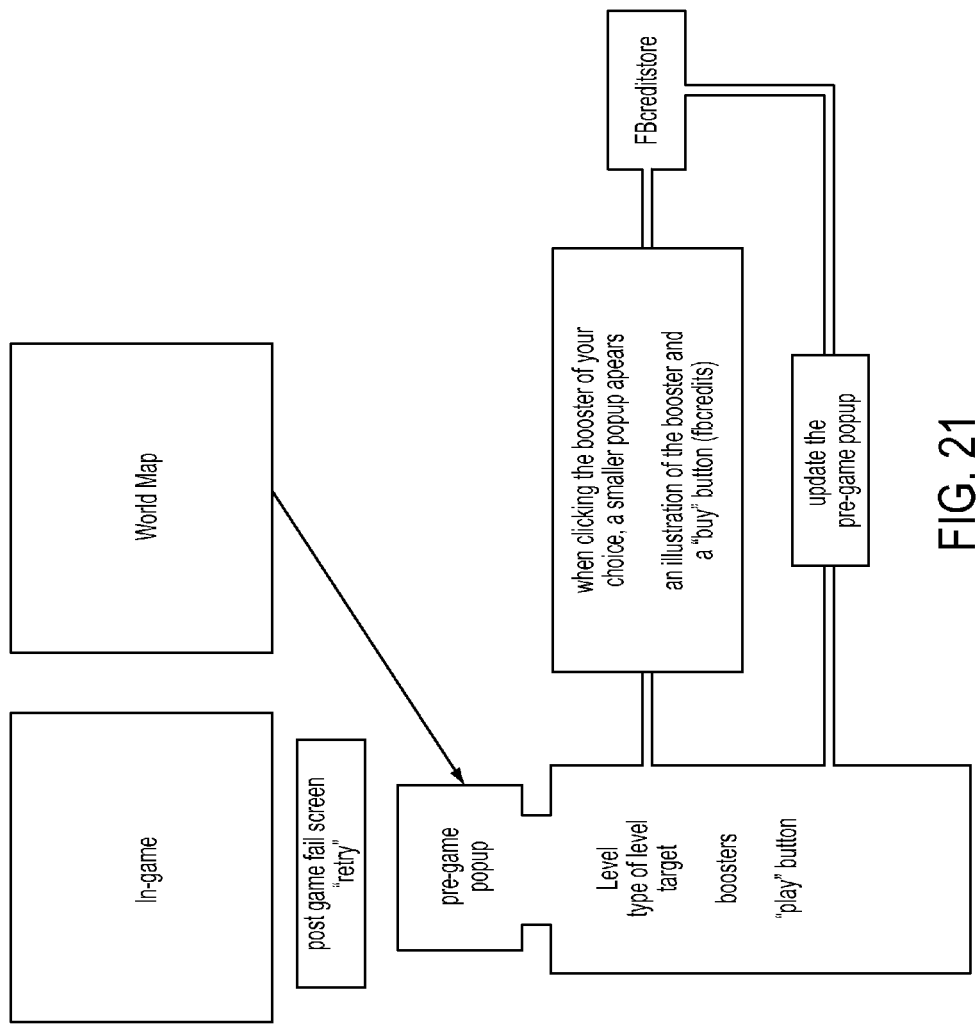
FIG. 21 shows an example game flow before starting a level.

FIG. 21 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 22:
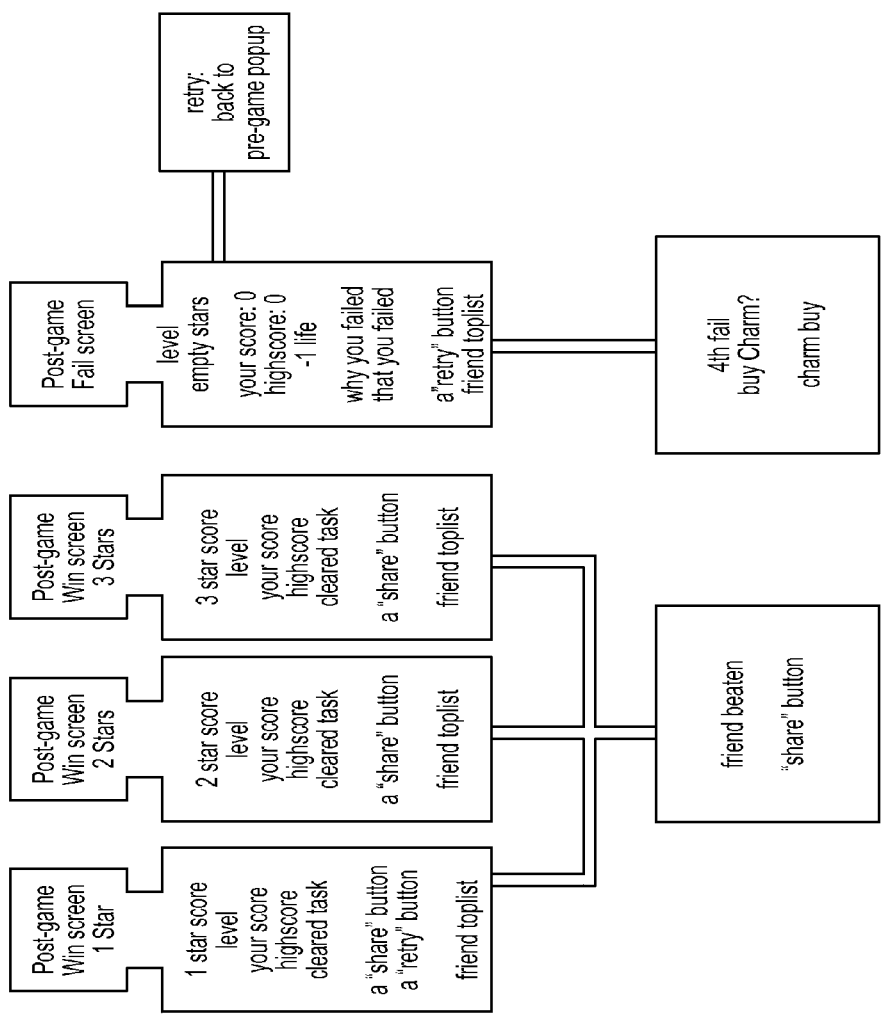
FIG. 22 shows an example game flow post-level.

After completing a level, the player is presented with a screen that shows the amount of points gained, the amount of stars achieved and also the previous highscores of friends. One implementation of the game flow related to the post-level screen is shown in FIG. 22.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 23:
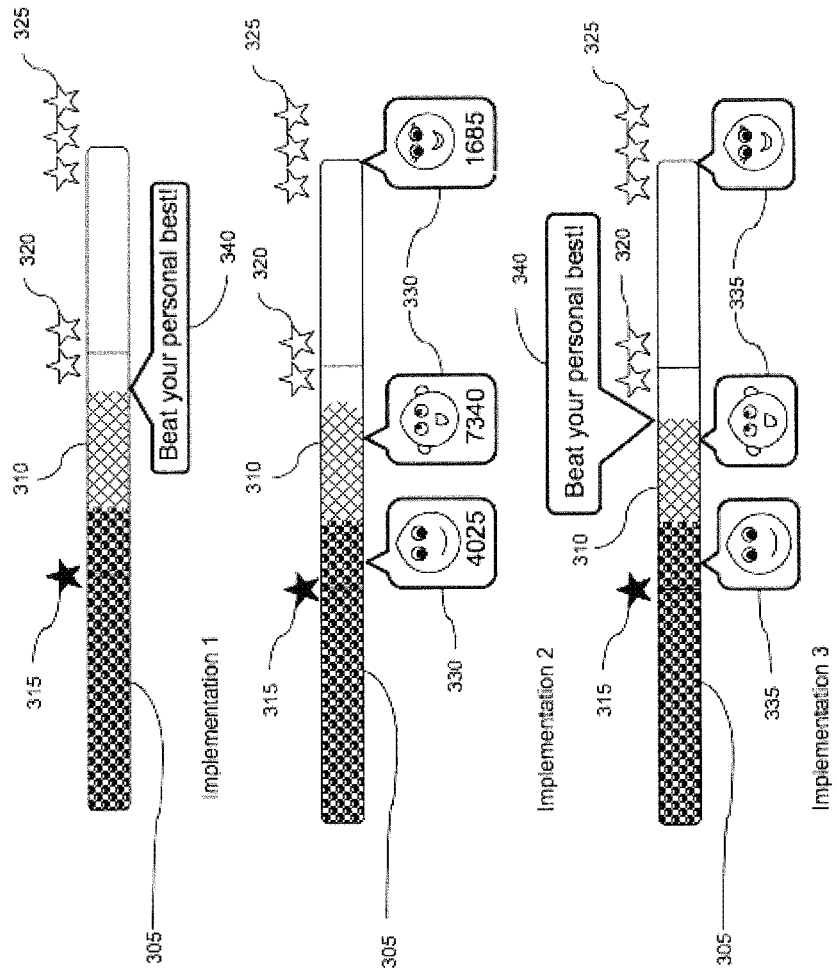
FIG. 23 shows example implementations of a score meter.

In some implementations, the player can see indications of the previous high score achieved on a level while playing it, shown by 310 in FIG. 23. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 23. When the player passes the score of another player or the previous best score the player has achieved, a message can be shown to encourage the player and denote the accomplishment. One example of such a message is illustrated by 340 in FIG. 23.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 24:
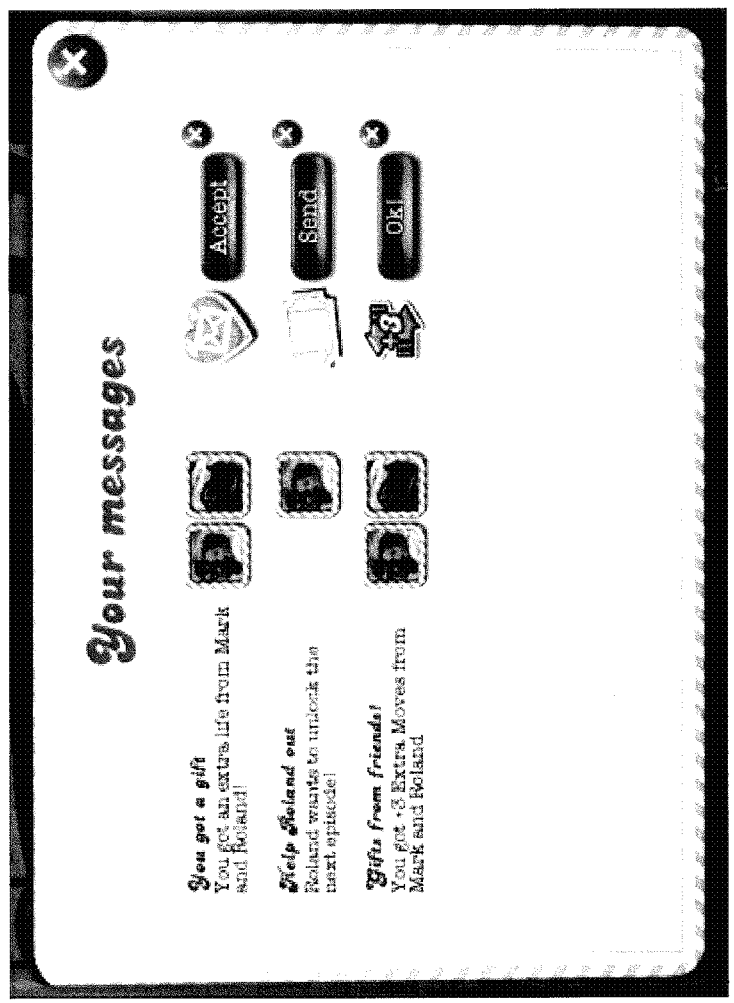
FIG. 24 shows an example implementation of giving and receiving gifts.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 24 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 25:
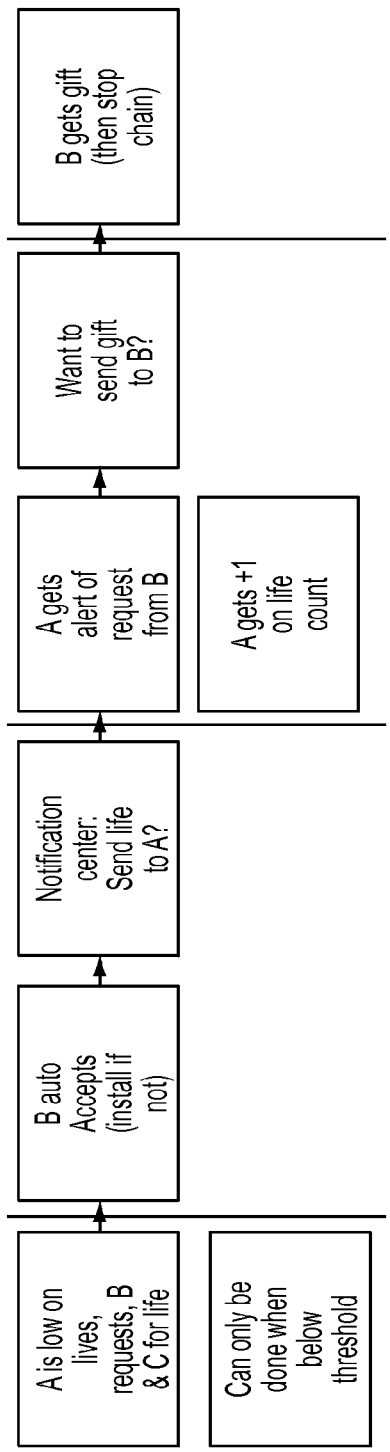
FIG. 25 shows an example flow chart of requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 25.

It is also possible to buy gifts in the in-game shop and send these to friends. Such gifts are in the form of boosters that can be used either during a level or before a level.

Sending Help to Other Players in the Form of for Instance Extra Moves and Extra Time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 26:
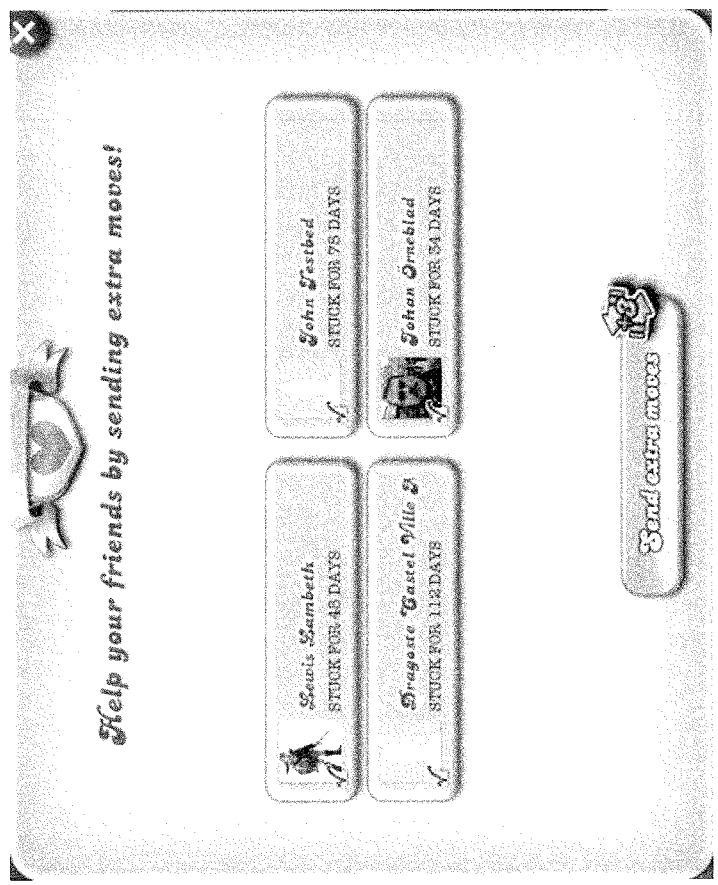
FIG. 26 shows an example implementation of a prompt screen.

The prompting from the game can happen at different points in the game, for instance when a player logs onto the game. Such prompting is illustrated in FIG. 26. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day., or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and in-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that are active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active. Some implementations may also have levels within the game which are designed specifically for certain physical locations; for example if visiting a Starbucks coffee shop there may be a level only accessible when visiting one of their premises. There may be another level designed for when visiting a certain city, airport, train and a variety of other places.

If trying to access the game online, as opposed to starting a local version that is saved on the device, while updates are being made, the player can be met by a message saying that the game cannot be accessed right at that moment.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A computer implemented method of managing game objects in a computer implemented game, presented on a display of a computer device having at least one processor, at least one memory and a user interface, said method comprising:
    displaying, on said display an arrangement of selectable game objects each having one or more characteristics, information on said arrangement of game objects and said one or more characteristics of said game objects being stored in said at least one memory,
    determining by said at least one processor, a selection of at least one first game object in dependence on a user input received via the user interface;
    evaluating by said at least one processor, using the stored information in said at least one memory, if the selected game object shares one or more characteristic with neighbouring objects in the arrangement displayed on said display; and
    determining by said at least one processor, an input time period of continuous selection of said at least one first game object; and indicating a valid status to a user by causing at least the said selected game object to be highlighted on said display when the selected at least one first game object shares one or more characteristics with neighbouring game objects and said continuous selection input time period exceeds a first time interval, wherein said first time interval has a value greater than a second time interval of continuous selection of a game object which causes at least said selected object to be removed.

2. A method according to claim 1, comprising, if the input time period of continuous selection exceeds the first time interval, causing the selected game object and neighbouring game objects with the same characteristic to be highlighted on the display.

3. A method according to claim 1, comprising, if the input time period of continuous selection is greater than the first time interval and the selected game object shares one or more characteristics with neighbouring game objects, and a subsequent input time period of continuous selection less than the first time interval is determined on a neighbouring game object with the same characteristic, removing the selected game object and neighbouring game objects with the same characteristic.

4. A method according to claim 1, wherein highlighting at least one game object comprises at least one of causing game objects to be animated, modifying display characteristics of said at least one game object and displaying a line around said at least one game object.

5. A method according to claim 1, wherein removing game objects comprises removing the game objects from the initial arrangement to provide an updated arrangement; and
    displaying said updated arrangement on the display.

6. A method according to claim 1, wherein determining the selection of the at least first game object in dependence on the user input received via the user interface comprises determining selection of a plurality of objects, said objects sharing at least one characteristic.

7. A method according to claim 1, wherein said user input is a touch user input.

8. An apparatus comprising at least one processor and at least one memory, said at least one processor and said at least one memory configured to perform at least one algorithm to provide a computer implemented game, said at least one processor configured to:
- cause display of an arrangement of selectable game objects, each having one or more characteristics;
- store said arrangement of selectable game objects in said at least one memory;
- determine a selection of the at least first game object in dependence on a user input received from a user interface;
- evaluate, using said stored information stored in said at least one memory, if the selected game object shares one or more characteristic with neighbouring game objects in the arrangement displayed on said display;
- determine an input time period of continuous selection of said at least one first game object, and, in dependence on the stored information on said arrangement, and, if the selected first game object shares one or more characteristics with neighbouring game objects, indicate a valid status to a user by causing at least the said selected object to appear highlighted on said display when said continuous selection input time period exceeds a first time interval, wherein said first time interval has a value greater than a second time interval of continuous selection of a game object which causes at least said selected object to be removed.

* * * * *